United States Patent
Aucejo Romero et al.

(10) Patent No.: US 12,441,903 B2
(45) Date of Patent: Oct. 14, 2025

(54) SUSCEPTOR INK COMPOSITIONS FOR MICROWAVEABLE PACKAGES

(71) Applicant: INSTITUTO TECNOLÓGICO DEL EMBALAJE, TRANSPORTE Y LOGÍSTICA (ITENE), Paterna (ES)

(72) Inventors: Susana Aucejo Romero, Paterna (ES); Maria Núria Herranz Solana, Paterna (ES); José Luis Vázquez Gutiérrez, Paterna (ES); Maria Del Carmen Gómez Almenar, Paterna (ES); Patricia Navarro Javierre, Paterna (ES)

(73) Assignee: INSTITUTO TECNOLÓGICO DEL EMBALAJE, TRANSPORTE Y LOGISTICA (ITENE), Paterna (ES)

( * ) Notice: Subject to any disclaimer, the term of this patent is extended or adjusted under 35 U.S.C. 154(b) by 878 days.

(21) Appl. No.: 16/612,374

(22) PCT Filed: May 10, 2018

(86) PCT No.: PCT/EP2018/062173
§ 371 (c)(1),
(2) Date: Nov. 9, 2019

(87) PCT Pub. No.: WO2018/206745
PCT Pub. Date: Nov. 15, 2018

(65) Prior Publication Data
US 2020/0062984 A1    Feb. 27, 2020

(30) Foreign Application Priority Data

May 11, 2017 (EP) .................................. 17382265

(51) Int. Cl.
| | |
|---|---|
| C09D 11/52 | (2014.01) |
| A23L 5/10 | (2016.01) |
| A23L 5/30 | (2016.01) |
| B65D 65/40 | (2006.01) |
| B65D 81/34 | (2006.01) |
| C09D 11/037 | (2014.01) |
| C09D 11/322 | (2014.01) |
| C09D 17/00 | (2006.01) |

(52) U.S. Cl.
CPC ................ *C09D 11/52* (2013.01); *A23L 5/15* (2016.08); *A23L 5/34* (2016.08); *B65D 65/40* (2013.01); *B65D 81/3446* (2013.01); *B65D 81/3469* (2013.01); *C09D 11/037* (2013.01); *C09D 11/322* (2013.01); *C09D 17/005* (2013.01); *C09D 17/006* (2013.01); *A23V 2002/00* (2013.01); *B65D 2581/3421* (2013.01); *B65D 2581/3464* (2013.01); *B65D 2581/3472* (2013.01); *B65D 2581/3479* (2013.01); *B65D 2581/3481* (2013.01); *B65D 2581/3483* (2013.01); *B65D 2581/3494* (2013.01)

(58) Field of Classification Search
CPC ......... A23L 5/15; A23L 5/34; B65D 81/3446; B65D 2581/3464; B65D 2581/3494
See application file for complete search history.

(56) References Cited

U.S. PATENT DOCUMENTS

| | | | | |
|---|---|---|---|---|
| 4,283,427 | A | * | 8/1981 | Winters ............. B65D 81/3446 219/730 |
| 4,806,718 | A | * | 2/1989 | Seaborne ................ C04B 35/64 426/243 |
| 4,959,516 | A | | 9/1990 | Tighe et al. |
| 4,970,358 | A | * | 11/1990 | Brandberg ......... B65D 81/3446 426/243 |
| 5,175,031 | A | * | 12/1992 | Ochocki ............ B65D 81/3446 426/243 |
| 5,349,168 | A | * | 9/1994 | Wilen ................ B65D 81/3446 426/243 |

FOREIGN PATENT DOCUMENTS

EP        0466361 A1    1/1992

OTHER PUBLICATIONS

ASTM D1475-13, Standard Test Method For Density of Liquid Coatings, Inks, and Related Products, ASTM International, West Conshohocken, PA, 2013.
ASTM D1200-10(2014), Standard Test Method for Viscosity by Ford Viscosity Cup, ASTM International, West Conshohocken, PA, 2005.

* cited by examiner

*Primary Examiner* — Alexander C Kollias
(74) *Attorney, Agent, or Firm* — Squire Patton Boggs (US) LLP

(57) ABSTRACT

The present invention relates to a susceptor combination comprising: metallic particles; particles of at least two or more semiconductor materials; and one or more alkaline or alkaline earth metal salts; to a susceptor ink composition containing it. It also relates to a laminate comprising a dielectric substrate and the susceptor ink composition printed on the substrate, as well as a microwaveable package comprising the laminate.

11 Claims, No Drawings

SUSCEPTOR INK COMPOSITIONS FOR MICROWAVEABLE PACKAGES

CROSS-REFERENCE TO RELATED APPLICATIONS

This application is a U.S. national stage application filed under 35 U.S.C. § 371 of International Patent Application No. PCT/EP2018/062173, filed on May 10, 2018, which claims the benefit of European Patent Application EP17382265.1 filed on May 11, 2017, all of which are incorporated herein by reference in their entirety.

The present invention relates to the field of susceptors, particularly to a susceptor combination useful for printing. It also relates to ink compositions containing the susceptor combination useful for microwaveable packages. Finally, the present invention also relates to a laminate containing the susceptor ink composition and microwaveable packages containing them.

BACKGROUND ART

A susceptor is a material used for its ability to absorb electromagnetic energy and to convert it into heat. The susceptor is formed by at least a conductive metal material that is used to transfer heat to another piece of metal or non-conductive material. This conductive material is commonly used to transfer the heat to the target by conduction or radiation. Susceptors have been widely used for the preparation of packaging material, and particularly to microwaveable food packaging. The microwaveable susceptor packages are typically formed by a substrate substantially transparent to microwave radiation normally made of paper or paperboard to which a layer of a conductive material is applied. The conductive material most commonly used is aluminized polyethylene terephthalate (PET), and it is usually deposited by vacuum metallisation. However, this process of manufacture is very expensive and increases the final price of the package.

Particularly, It has been disclosed the use of a sheet for microwave heating in which the aluminized PET susceptor is deposited on the paper substrate through an adhesive-free extrusion process. Besides, it has been also disclosed a susceptor in which an adhesive containing nickel, chromium and iron is used to join the metallised PET layer to the paper substrate. However, all these processes are still complex and expensive because of the processing equipment that is needed to apply them.

Thus, in order to improve the quality of the susceptor and also to reduce the cost of the final package, in the recent years it has been developed susceptor ink compositions that can be applied using conventional printing techniques. In particular, these susceptor ink compositions often use silver based ink as conductive material. However, these silver based inks are still expensive and had a tendency to char or burn at elevated temperatures.

It has been disclosed in the state of the art ink compositions having aluminium/calcium carbonate, aluminium/silicon carbide, and aluminium/carbon black and carbon black/magnesium sulfate heptahydrate. However, these ink compositions are unsuitable for being used as susceptor (cf. EP0466361, U.S. Pat. Nos. 4,959,516 and 4,970,358).

Therefore, from what is known in the art it is derived that there is still the need of providing a less costly susceptor ink compositions having good conductive properties and appropriate procesability, which can be applied by conventional printing methods.

SUMMARY OF INVENTION

Inventors have found that a susceptor combination comprising metallic particles; particles of at least two semiconductor materials; and one or more alkaline or alkaline earth metal salts can be dispersed in a vehicle to produce a susceptor ink composition which is appropriate for being printed by conventional printing methods on the surface of a substrate to obtain a susceptor laminate (and therefore a package) with improved quality, enhanced conductivity and good processabilty. Therefore, the susceptor combination of the invention is useful for printing. In particular, the use of the susceptor combination of the invention allows preparing a susceptor package by a more effective, simple and economically viable process.

Besides, the inventors have also found that the suspector combination of the invention is stable under the processability and cooking conditions, having also good adhesive properties. Therefore, the susceptor ink composition containing the susceptor combination of the invention mantains its integrity after cooking. It is advantageous because it means that there is no contamination of the foodstuff due to migration of decomposing compounds from the susceptor to the foodstuff.

Finally, the susceptor combination of the present invention also allows preparing susceptor packaging having improved time-temperature profiles which results in a most effective cooking of the foodstuff. This is advantegeous because this combination allows preparing the cooked foodstuff with the optimal organoleptic properties.

Thus, the first aspect of the invention relates to a susceptor combination comprising: metallic particles; particles of at least two semiconductor materials; and one or more alkaline or alkaline earth metal salts.

The second aspect of the invention relates to a susceptor ink composition comprising the susceptor combination as defined in the first aspect of the invention together with one or more carriers.

The third aspect of the invention relates to a laminate comprising a dielectric substrate and a susceptor ink composition as defined in the second aspect of the invention printed on the substrate; and optionally a dielectric protective layer onto the substrate.

Finally, the fourth aspect of the invention relates to a microwaveable package comprising the laminate as defined in the third aspect of the invention.

DETAILED DESCRIPTION OF THE INVENTION

All terms as used herein in this application, unless otherwise stated, shall be understood in their ordinary meaning as known in the art. Other more specific definition terms as used in the present application are as set forth below and are intended to apply uniformly throughout the specification and claims unless an otherwise expressly set out definition provides a broader definition.

For the purposes of the invention, any ranges given include both the lower and the upper end-points of the range. Ranges given, such as temperatures, times, and the like, should be considered approximate, unless specifically stated.

The term "percentage (%) by weight" refers to the percentage of each ingredient of the combination in relation to the total weight of the combination; or alternatively to the percentage of each ingredient of the composition in relation to the total weight of the composition.

The term "weight ratio" refers to the relation in weight of a given compound to another given compound, for instance, between the aluminium and the carbon black.

The term "metallic particles" refers to particles formed of one or more metals.

The term "dielectric" refers to a substrate, layer or a material that has a very low electrical conductivity (i.e. an insulator). Such dielectric substances have typically an electrical resistivity which is greater than $10^8$ ohm-meter. The term "electrical resistivity" refers to a measure of how strongly a susceptor of the present invention opposes the flow of electric current. In particular, the electrical resistivity is the resistance of a substrate, layer or a material in slowing down the electrical current when the substrate, layer or a material is subject to a potential difference. The value of the electrical resistivity is calculated by the following equation:

$$\rho = (V \times A)/(I \times L)$$

wherein:

V is the potential difference across the substrate, layer or material;

A is the cross-section area;

I is the electrical current flowing through it; and

L is the length of the material.

The term "particles of semiconductor material" refers to particles formed of one or more semiconductor materials which include elements or compounds having an electrical conductivity intermediate between that of conductors (e.g., metals) and non-conductors (insulators). The resistivity of semiconductor materials, depends not only on the basic material but to a considerable extent on the type and amount of impurities in the base material, and also on the temperature when measured. The resistivity of semiconductors materials typically ranges from $10^{-4}$ to $10^5$ ohm-meter.

The term "particle size" refers to the size of the metallic particles measured in μm. The measurement was performed with an appropriate apparatus by conventional analytical techniques such as, for example, microscopic determination utilizing a scanning electron microscope (SEM). In the present invention the particle size was measured by a Mastersizer 2000 particle size analyzer. Such apparatus uses a technique of laser diffraction to measure the size of particles. It operates by measuring the intensity of light scattered, as a laser beam passes through a dispersed particles sample. This data is then analyzed using the general purpose model to calculate the size of the particles that created the scattering pattern, assuming a spherical particle shape.

The terms "particle size distribution" or "PSD" have the same meaning and are used interchangeably. They refer to the percentage of the metallic particles within a certain size range. The term "D90" refers to the value of particle size distribution where at least 90% of the metallic particles have a size less or equal to the given value. Further, the term "D50" refers to the value of particle size distribution where at least 50% of the metallic particles have a size less or equal to the given value.

The terms "flexographic printing" or "flexography" have the same meaning and are used interchangeable. They refer to a method of direct rotary printing utilizing relief image plates. The plates are secured to one or more cylinders and the ink is applied to the plates by a cell structured, ink-metering roll such as an "anilox" roll which delivers a liquid ink to a surface of the relief image plates. Each revolution of the relief image plate bearing cylinder applies a print or image to an associated substrate.

The term "gravure printing" refers to a printing method of forming an intaglio printing pattern on a surface of a cylindrical roll, injecting ink into the intaglio printing pattern, and transferring the pattern to a surface of a printing substrate winded in the form of a roll. Printing inks are transferred from these engravings to the substrate to be decorated. This can be accomplished by direct transfer of the ink from the gravure to the substrate, or indirectly through the use of an intermediate transfer element such as an offset blanket. This definition includes intaglio, rotogravure, etched plates and the like.

The term "digital printing" refers to methods of printing from a digital-based image directly to a variety of substrates. Examples of digital printing techniques include inkjet printing and laser printing. The term "Inkjet printing" is a digital printing technique known in the art that recreates a digital image by propelling droplets of a colorant, for example, an ink onto a substrate. Typically printheads using e.g. piezo-electric crystals are used to deposit the droplets on the substrate. Generally, there are two main technologies in use in contemporary inkjet printing processes: continuous (CIJ) and Drop-on-demand (DOD).

As mentioned above, the first aspect of the present invention refers to susceptor combination comprising metallic particles; particles of at least two semiconductor materials; and one or more alkaline or alkaline earth metal salts. In an embodiment, optionally in combination with one or more features of the various embodiments described above or below, the susceptor combination comprises metallic particles; particles of two semiconductor materials; and one alkaline or alkaline earth metal salts.

In an embodiment, optionally in combination with one or more features of the various embodiments described above or below, the metallic particles are selected from the group consisting of nickel, zinc, copper, aluminium and mixture thereof. In an embodiment, optionally in combination with one or more features of the various embodiments described above or below, the susceptor combination comprises particles of one metallic material; preferably aluminium. In an embodiment, optionally in combination with one or more features of the various embodiments described above or below, the metallic particles are in form of metal or alternatively in a particulate form. In an embodiment, optionally in combination with one or more features of the various embodiments described above or below, the metallic particles are in form of a particulate form selected from the group consisting of flakes, fibres, nanotubes, nanowires, and mixture thereof. In a particular embodiment, optionally in combination with one or more features of the various embodiments described above or below, the metallic particles are aluminium flakes.

In an embodiment, optionally in combination with one or more features of the various embodiments described above or below, the particles of at least two semiconductor materials are selected from the group consisting of carbon black, titanium carbide, silicon carbide, zinc oxide and mixture thereof. In an embodiment, optionally in combination with one or more features of the various embodiments described above or below, the susceptor combination comprises particles of two semiconductor materials; preferably carbon black and silicon carbide.

The terms "carbon black" refers to a carbon pigment comprising a form of carbon manufactured by incomplete combustion or thermal decomposition of hydrocarbon mixtures, such as heavy petroleum distillates and residual oils, coal-tar products, natural gas and acetylene. As known to those skilled in the art, carbon blacks are generally categorized as acetylene black, channel black, furnace black, lampblack or thermal black, and the surface-modified variations thereof, according to the process by which they are manufactured. Types of carbon black can be characterized by the size distribution of the primary particles, the degree of their aggregation and agglomeration and the various chemicals adsorbed onto the surfaces. An average primary particle diameter in several commercially produced carbon blacks range from between about 10 nm to about 400 nm, while average aggregate diameters range from between about 100 nm to about 800 nm.

In an embodiment, optionally in combination with one or more features of the various embodiments described above or below, the cation of the alkaline or alkaline earth metal salt is selected from the group consisting of $Na^+$, $K^+$, $Mg^{2+}$ and $Ca^{+2}$ and the anion is selected from the group consisting of $Cl^-$, and $F^-$. In an embodiment, optionally in combination with one or more features of the various embodiments described above or below, the susceptor combination comprises one alkaline or alkaline earth metal salt being sodium chloride.

In an embodiment, optionally in combination with one or more features of the various embodiments described above or below, the susceptor combination is one wherein the metallic particles are aluminium; the particles of at least two semiconductor materials are carbon black and silicon carbide; and the alkaline or alkaline earth metal salt is sodium chloride.

In an embodiment, optionally in combination with one or more features of the various embodiments described above or below, the susceptor combination is one which comprises from 10% to 50% by weight of aluminium of the total weight of the combination; from 20% to 70% by weight of carbon black of the total weight of the combination; from 2% to 40% by weight of silicon carbide of the total weight of the combination; and from 2% to 20% by weight of sodium chloride of the total weight of the combination.

The particle size of the metallic particles and the semiconductor materials can readily be determined by those skilled in the art according to the type of printing technique being used.

It is also part of the invention a process for the preparation of the susceptor combination of the first aspect of the invention. In an embodiment, optionally in combination with one or more features of the various embodiments described above or below, the process for the preparation of the susceptor combination comprises firstly grounding in separated mills the metallic particles, the particles of the semiconductive materials and the alkaline or alkaline earth metal salt; and secondly mixing the grounded components to obtain the susceptor combination. This process is advantegeous because allows grounding each component to different particle sizes. In an alternative embodiment, the process for the preparation of the susceptor combination comprises firstly mixing the metallic particles, the particles of the semiconductive materials and the alkaline or alkaline earth metal salt; and secondly grounding in the same mill to obtain the susceptor combination.

As mentioned above, the second aspect of the invention relates to a susceptor ink composition comprising the susceptor combination as defined in the first aspect of the invention together with one or more carriers. These ink compositions are appropriate for being printed using conventional printing techniques over a dielectric substrate. The term "carrier" refers to a compound that provide a vehicle for the printing ink combination and also permits to adjust the rheological and physical properties of the susceptor ink composition. In an embodiment, the carrier is selected from the group consisting of solvents, resins, antifoamers, plasticizers and mixture thereof.

In an embodiment, the carrier comprises a mixture of solvents and resins. In an embodiment, the carrier comprises a mixture of solvents, resins and antifoamers. In an embodiment, the carrier comprises a mixture of solvents, resins and plasticizers. In an embodiment, the carrier comprises a mixture of solvents, resins, antifoamers and plasticizers. The choosen of the appropriate ingredients and their amounts, can readily be determined by those skilled in the art according to the type of printing technique being used for their application over a substrate.

The solvent helps to control the viscosity, to dissolve other ingredients of the composition, to maintain wet the ink during its application and to control the drying rate. The term "solvent" also encompasses co-solvents. Examples of appropriate solvents and co-solvents include, but are not limited to, water, $(C_1-C_8)$ alcohols (such as e.g. ethanol, isopropyl alcohol, n-butyl alcohol, i-butyl alcohol, n-pentanol), glycols (such as e.g. ethylene glycol, propylene glycol, PEG 200, PEG 400) and mixture thereof.

The term "resin" refers to compounds that aid in the formation of a film or coating. Resins give the final printed film the strenght and adhesion to the substrate. They also act as a binder that holds the particles of the combination together. Examples of appropriate resins include, but are not limited to, acidic resins such as acrylic resin, and maleic resin; vinyl resin such as polyvinyl acetate, polyvinyl formal, polyvinyl butyral, vinyl acetate-chloride copolymers, vinyl chloride-vinylidene chloride copolymers; shellac; celluloses such as ethyl cellulose and nitrocellulose; polyurethane resins; and mixture thereof.

The term "antifoamer" refers to an agent that prevents the formation of foam or remove it by penetrating the foam lamella, destabilizing it and making it burst. Antifoamers encompasses active substances such as polysiloxanes (silicones); mineral oils; vegetable oils; and/or polymers. Examples of appropriate polymer-based antifoamer agents include without limitation modified fatty acids, polyethers or modified amides. In an embodiment, the defoamer is a polymer-based defoamer selected from the group consisting of $(C_1-C_{18})$alkyl polyalkyleneglycol ether. The term "alkyl" refers to a saturated straight, or branched hydrocarbon chain which contains the number of carbon atoms specified in the description or claims. Examples include, among others, the group methyl, ethyl, propyl, isopropyl, butyl, isobutyl, sec-butyl, tert-butyl, n-pentyl, and n-hexyl.

The term "plasticizer" refers to a compound that aids in the formation of a film or coating or impart to the film or coating other desirable characteristics such as more flexibility. Appropriate plasticizer for the susceptor combination of the present invention can be any plasticizer commonly used in printing ink compositions.

In an embodiment, the susceptor composition as defined above further comprises one or more additional additives. The term "additive" refers to any ingredient commonly used in printing ink compositions which do not alter both the conductivity of the composition, and the rheological and physical properties of the susceptor ink composition. Appropriate additional ingredients useful for the present invention includes, but not limited to, biocide agents, pigments, antioxidants, deodorants, and mixture thereof. The appropriate ingredients and their amounts, can readily be determined by those skilled in the art according to the type of printing technique being used.

The term "biocide agent" refers to a chemical ingredient capable of destroying a harmful organism; or counteracting, neutralizing, or avoiding the action of a harmful organism; or exercise any control over a harmful organism, by chemical or biological means. In the susceptor combination of the invention the biocide agent preserves the ink during storage. Examples of appropriate biocide agents include inorganic borates such as zinc borate hydrate (commercially available as Borogard®), 7-Ethyl bicyclooxazolidine, sodium o-phenylphenate, sodium pyrithione, 1,2-benzisothiazolin-3-one and 2,6-dimethyl-m-dioxan-4-ol acetate, and mixture thereof.

The term "pigment" or "dye" have the same meaning and are used interchangeable. They refer to coloured compound that can alter the colour of the susceptor ink composition. Appropriate pigments for the susceptor combination of the present invention can be any pigment commonly used in printing ink compositions.

The term "anti-oxidant" refers to a compound that retards or eliminates oxidation and deterioration of the ink. Examples of antioxidants appropriate for the suspector composition of the present invention include, but are not limited to, phenol, substituted phenol, sodium phosphite, and mixture thereof.

The term "deodorant" refers to a compound that removes or conceals odor. Appropriate deodorants for the susceptor combination of the present invention can be any deodorant commonly used in printing ink compositions.

The appropriate ingredients and their amounts, can readily be determined by those skilled in the art according to the type of printing technique being used.

All the embodiments disclosed above for the components of the susceptor combination of the first aspect of the invention, also applies for the susceptor ink composition of the second aspect of the invention.

In an embodiment, optionally in combination with one or more features of the various embodiments described above or below, the susceptor ink composition is one wherein the amount of the susceptor combination is comprised from 6.7% to 40% by weight of the total weight of the composition; preferably comprised from 8% to 30% by weight; more preferably comprised from 10% to 25% by weight.

In an embodiment, optionally in combination with one or more features of the various embodiments described above or below, the susceptor ink composition is one wherein the susceptor combination comprises aluminium and carbon black; preferably, the susceptor ink composition comprises aluminium, carbon black, silicon carbide, and sodium chloride. In an embodiment, optionally in combination with one or more features of the various embodiments described above or below, the susceptor ink composition is one wherein the susceptor combination comprises aluminium and carbon black in a weight ratio comprised from 2:1 to 1:4; preferably the weight ratio is 1:2.

In an embodiment, optionally in combination with one or more features of the various embodiments described above or below, the susceptor ink composition is one comprising from 2% to 15% by weight of aluminum of the total weight of the composition; from 2% to 15% by weight of carbon black of the total weight of the composition; from 0.2% to 25% by weight of silicon carbide of the total weight of the composition; from 0.2% to 5% by weight of sodium chloride of the total weight of the composition; and preferably the total weight of the sum of the aluminium, carbon black, silicon carbide, and sodium chloride is comprised from 10 to 25% by weight of the total weight of the composition.

In an embodiment, optionally in combination with one or more features of the various embodiments described above or below, the susceptor ink composition is one comprising from 3% to 10% by weight of aluminum of the total weight of the composition; from 3% to 10% by weight of carbon black of the total weight of the composition; from 0.5% to 5% by weight of silicon carbide of the total weight of the composition; from 1% to 3% by weight of sodium chloride of the total weight of the composition; and preferably the total weight of the sum of the aluminium, carbon black, silicon carbide, and sodium chloride is comprised from 10 to 25% by weight of the total weight of the composition.

The susceptor ink compositions of the invention are appropriate for being printed on a substrate by conventional printing methods and equipments, such as for example by gravure printing, flexography, and inkjet. Thereby, the susceptor ink composition is selected from the group consisting of a flexographic susceptor ink composition, a gravure printing susceptor ink composition, and an inkjet susceptor composition.

The physical appearance and rheological properties of the susceptor ink composition of the second aspect of the invention are determined greatly by the type of printing technique being used. The appropriate physical and rheological parameters can readily be determined by those skilled in the art according to the type of printing technique being used for their application over a substrate. Typically, inks which are printed by the flexographic and gravure printing processes are characterized by their extremely fluid nature. They are generally described as liquid inks. Both inking systems involve only a short time and distance between the ink supply and the metered film of ink applied to the substrate. Thus, highly volatile solvents can be used and most flexographic and gravure inks are fast drying.

In an embodiment, optionally in combination with one or more features of the various embodiments described above or below, the susceptor ink composition is one having a density comprised from 800 to 1500 g/cm$^3$; preferably comprised from 900 to 1200 g/cm$^3$.

The measurement of the density was performed with an appropriate apparatus by conventional analytical techniques known in the state of the art. Particularly, the density of the susceptor compositions of the present invention was measured by specific gravity cup, following the procedure described in ASTM D 1475 "Standard Test Method For Density of Liquid Coatings, Inks, and Related Products" (cf. ASTM D1475-13, Standard Test Method For Density of Liquid Coatings, Inks, and Related Products, ASTM International, West Conshohocken, PA, 2013).

In an embodiment, optionally in combination with one or more features of the various embodiments described above or below, the susceptor ink composition is one having a viscosity comprised from 50 to 500 s; preferably comprised from 100 to 250 s. The measurement of the viscosity was performed with an appropriate apparatus by conventional analytical techniques known in the state of the art. Particularly, the viscosity of the susceptor compositions of the present invention was measured by the Ford viscosity cup at room temperature in accordance with ASTM D 1200. The term "room temperature" refers to a temperature of the environment, without heating or cooling, and is generally comprised from 20° C. to 25° C. (cf. ASTM D1200-10 (2014), Standard Test Method for Viscosity by Ford Viscosity Cup, ASTM International, West Conshohocken, PA, 2014)

It is also part of the invention a process for the preparation of the susceptor ink composition of the invention. In an embodiment, optionally in combination with one or more features of the various embodiments described above or below, the process for the preparation of the susceptor ink composition comprises adding under agitation the susceptor combination of the invention to the carrier.

In an embodiment, optionally in combination with one or more features of the various embodiments described above or below, the process further comprises a previous step before mixing the susceptor combination with the carrier that comprises preparing the carrier by mixing the components forming part of the carrier until completely solubility.

When the susceptor combination further comprises one or more additives, the process further comprises a previous step before mixing the susceptor combination with the carrier that comprises preparing the carrier by mixing the components forming part of the carrier until completely solubility, and adding the additive to the mixture thus obtained.

As mentioned above, the third aspect of the invention relates to a laminate which comprises a dielectric substrate and a susceptor ink composition as defined in the second aspect of the invention printed on the substrate. Thus, the susceptor ink composition of the invention is printed over the whole surface or in any prescribed pattern. When a prescribed pattern is printed, this pattern can be in any shape such as square, circle, rectangle, triangle, diamond, letters, numbers or even the shape of the product being heated.

In an embodiment, optionally in combination with one or more features of the various embodiments described above or below, the laminate is one wherein the dielectric substrate comprises a dielectric material selected from the group consisting of paper, paperboard, clay, polymeric material, fabric, wood and mixture thereof.

In an embodiment, optionally in combination with one or more features of the various embodiments described above or below, the laminate further comprises a dielectric protective layer that comprises a dielectric material, which avoids contacting the susceptor ink composition printed on the substrate with the foodstuff. In an embodiment, optionally in combination with one or more features of the various embodiments described above or below, the dielectric protective layer is formed by one (monolayer) or more than one layer (multilayer) of dielectric material as defined above. The dielectric materials useful for the dielectric protective layer are those disclosed above.

In an embodiment, optionally in combination with one or more features of the various embodiments described above or below, wherein when the laminate comprises the dielectric protective layer, then the laminate further comprises an additional intermediate adhesive layer bonding the dielectric substrate and the dielectric protective layer. The term "adhesive layer" refers to any layer having adhesive properties. Examples of adhesives include, but are not limited to, polyvinyl acetate (PVAc), ethylene vinyl acetate (EVA), styrene acrylic, casein and mixture thereof.

All the embodiments disclosed above for the susceptor combination of the first aspect of the invention, as well as for the susceptor ink composition of the second aspect of the invention also applies for the laminate of the third aspect of the invention.

It is also part of the invention a process for the preparation of the laminate of the third aspect of the invention. In an embodiment, optionally in combination with one or more features of the various embodiments described above or below, the process for the preparation of the laminate comprises printing the susceptor ink composition of the second aspect of the invention on the surface of the substrate. In an embodiment, optionally in combination with one or more features of the various embodiments described above or below, the process comprises printing the susceptor ink composition by a printing technique selected from the group consisting of flexography, gravure printing and inkjet. The reaction conditions of the printing step are determined greatly by the type of printing technique being used. The appropriate printing conditions as well as the amount of the susceptor ink composition can readily be determined by those skilled in the art.

In an embodiment, optionally in combination with one or more features of the various embodiments described above or below, when the laminate comprises a dielectric protective layer, the process further comprises attaching the laminate thus obtained to a dielectric material; optionally in the presence of an adhesive.

The laminate of the present invention can be forming part of a microwaveable container. Thus, the fourth aspect of the invention relates to a microwaveable package comprising the laminate as defined above. In an embodiment, optionally in combination with one or more features of the various embodiments described above or below, the microwaveable package is selected from the group consisting of bag, box, tray, plate, sleeve and envelope.

In an embodiment, optionally in combination with one or more features of the various embodiments described above or below, microwaveable package of the invention is a food microwaveable package. Examples of suitable food products include, but are not limited to, corn kernes (popcorn), bakery product such us bread, fresh cut vegetables, pizza, baked potatoes, grilled vegetables, sandwiches, bacon, meat steaks and fondue.

In an embodiment, optionally in combination with one or more features of the various embodiments described above or below, the laminate is forming part of the whole surface of the container; or alternatively, the laminate is forming part of the package in any prescribed size and pattern.

All the embodiments disclosed above for the susceptor combination of the first aspect of the invention, for the susceptor ink composition of the second aspect of the invention, and for the laminate of the third aspect of the invention also applies for the microwaveable package of the fourth aspect of the invention.

It is also part of the invention a process for the preparation of the microwaveable package. Any process for the preparation of microwaveable packages known in the state of the art can be used for the preparation of the microwaveable package of the present invention. The appropriate process can readily be determined by the skilled in the art according to the type of package being prepared.

It is also part of the invention a susceptor combination comprising: metallic particles; and particles of two semiconductor materials; or alternatively metallic particles; particles of one semiconductor material, and one alkaline or alkaline earth metal salt. It is also part of the invention a process for its preparation. All the embodiments disclosed above for the susceptor combination of the first aspect of the invention and its process of preparation also applies for these ternary susceptor combination.

In an embodiment, optionally in combination with one or more features of the various embodiments described above or below, the susceptor combination comprises metallic particles; and particles of two semiconductor materials; preferably aluminium, carbon black and silicon carbide. In an embodiment, optionally in combination with one or more features of the various embodiments described above or below, the susceptor combination comprises metallic particles, particles of one semiconductor material, and one alkaline or alkaline earth metal salt; aluminium, carbon black and sodium chloride.

It is also part of the invention a susceptor ink composition which comprises a susceptor combination comprises: metallic particles; particles of two semiconductor materials; or alternatively metallic particles; particles of one semiconductor material, and one alkaline or alkaline earth metal salt. It is also part of the invention a process for its preparation. All the embodiments disclosed above for the susceptor combination of the first aspect of the invention, for the susceptor ink composition of the second aspect of the invention, as well as for their process of preparation also applies for these susceptor ink composition.

It is also part of the invention a laminate comprising a dielectric substrate and a susceptor ink composition printed on the substrate, wherein the susceptor combination comprises: metallic particles; particles of two semiconductor materials; or alternatively metallic particles; particles of one semiconductor material, and one alkaline or alkaline earth metal salt. It is also part of the invention a process for its preparation. All the embodiments disclosed above for the susceptor combination of the first aspect of the invention, for the susceptor ink composition of the second aspect of the invention, for the laminate of the third aspect of the invention, as well as for their process of preparation also applies for these laminates.

It is also part of the invention a microwaveable package comprising the laminate comprising a dielectric substrate and a susceptor ink composition printed on the substrate, wherein the susceptor combination comprising: metallic particles; particles of two semiconductor materials; or alternatively metallic particles; particles of one semiconductor material, and one alkaline or alkaline earth metal salt. It is also part of the invention a process for its preparation. All the embodiments disclosed above for the susceptor combination of the first aspect of the invention, for the susceptor ink composition of the second aspect of the invention, for the laminate of the third aspect of the invention, for the microwaveable package of the fourth aspect of the invention, as well as for their process of preparation also applies for these laminates.

Throughout the description and claims the word "comprise" and variations of the word, are not intended to exclude other technical features, additives, components, or steps. Furthermore, the word "comprise" encompasses the case of "consisting of". Additional objects, advantages and features of the invention will become apparent to those skilled in the art upon examination of the description or may be learned by practice of the invention. The following examples are provided by way of illustration, and they are not intended to be limiting of the present invention. Furthermore, the present invention covers all possible combinations of particular and preferred embodiments described herein.

Examples

1. Susceptor Ink Composition

The composition of the susceptor ink composition of the present invention is shown in Table 1 and 2, wherein the amounts of the components are expressed in weight percent in relation to the total weight of the composition:

TABLE 1

| Ingredients of the composition | | |
|---|---|---|
| Name | Function | Amount (%) |
| Aluminium based ink HIDROGRAF 12010072 | Metallic particles (and carrier) | 48.54 |
| carbon black based ink marketed as PAPERLIGHT 12.049.808 | Particles of semiconductor material (and carrier) | 48.54 |
| Silicon carbide (SiC) | Particles of semiconductor material | 0.97 |
| Sodium chloride (NaCl) | Alkaline or alkaline earth metal salt | 1.95 |

TABLE 2

| % of the components of the combination | | |
|---|---|---|
| Name | Components | Amount (%) |
| Susceptor combination 1 | Aluminium[1] | 6.31 |
| | Carbon black[2] | 4.85 |
| | Silicon carbide | 0.97 |
| | Sodium chloride | 1.94 |

[1]Aluminium is in form of aluminium based ink marketed as HIDROGRAF 12010072.
[2]Carbon black is in form of carbon black based ink marketed as PAPERLIGHT 12.049.808.

The susceptor ink composition 1 was prepared by adding the Aluminum based ink (HIDROGRAF), the Carbon Black based ink (PAPERLIGHT), the Silicon Carbide and the Sodium Chloride under agitation.

2. Microwaveable Package:

2.1. Microwaveable Package of the Invention 2.1.1. Microwaveable Popcorn Bag

The microwaveable popcorn bag 1 of the invention is formed by a dielectric substrate made of Kraft paper wherein the susceptor ink composition 1 was manually printed in a rectangular area of 120×140 mm.

The process for the preparation of the microwaveable popcorn bag 1 is as follows:

(i) Preparation of the Laminate:

The susceptor ink composition 1 as defined in example 2 was printed manually on a 60 mg/m² Kraft paper (commercially available from IMCOVEL), by means of a 250 mm and 4 μm spiral applicator (Elcometer bar K0004360P001). The susceptor ink composition 1 was printed in a rectangular area of 120×140 mm, with an approximate grammage of 10,780 g/m².

Then, the printed kaft paper thus obtained was protected by attaching greaseproof paper (commercially available as Gascogne with greaseproof Kit 10) to the side of the printed susceptor to obtain a laminate formed by the substrate (kraft paper) having the susceptor ink composition 1 printed on the surface and covered by the protective dielectric layer. The substrate and the protective layer were bonded with Paniker industrial adhesive.

(ii) Preparation of the Package:

The laminate obtained in step (i) was placed in a commercial popcorn bag, positioned where the commercial susceptor used to be (the commercial susceptor was previously trimmed and removed).

To the popcorn bag thus obtained, corn and fat/grease were introduced inside the bag. And, then the bag was sealed with Paniker industrial adhesive to obtain the microwaveable popcorn bag 1.

2.2. Comparative Microwaveable Package

2.2.1. Comparative Microwaveable Package 1

The comparative microwaveable package 1 is a popcorn bag without a printed ink susceptor composition having inside corn and fat/grease. In particular, the package is a popcorn bag to which the susceptor was previously trimmed, removed and replaced by a laminate made of a layer of kraft paper bonded with Paniker industrial adhesive to a layer of Gascogne with greaseproof Kit 10.

2.2.2. Comparative Microwaveable Package 2

The comparative microwaveable package 2 is a commercial popcorn bag including fat/grease and having an ink susceptor falling outside the scope of the protection of the invention. Particularly, the susceptor is made of a layer of aluminized-PET.

3. Cooking Test

The microwaveable popcorn bag 1 and the comparative microwaveable packages 1 and 2 were cooked for 2 minutes and 20 seconds in a conventional microwave at 700 W. The palm fat and corn kernels content expressed in grams on each sample are shown in Table 3:

TABLE 3

| Microwaveable package | Corn Kernels (g) | Palm fat (g) |
|---|---|---|
| Comparative microwaveable package 1 | 64 | 16 |
| Comparative microwaveable package 2 | 72 | 8 |
| microwaveable package 1 | 72 | 8 |

Furthermore, the test of the first pop, the volume of popcorns and their weight were measured. It was also measured the percentage of popcorns with respect to the total of corn that carries the bag.

TABLE 4

| Microwaveable package | 1st pop | Volume (L) | Cooking[1] |
|---|---|---|---|
| Comparative microwaveable package 1 | 1'31" | 1.9 | 82.09 ± 2.00[1] |
| Comparative microwaveable package 2 | 1'27" | 2.2 | 85.04 ± 3.92[1] |
| microwaveable package 1 | 1'34" | 2.4 | 88.05 ± 1.62[2] |

[1]Values correspond to the average of three repetitions and their standard deviation.
[2]Values correspond to the average of nine repetitions and their standard deviation The results of Tables 3 and 4 show that the microwaveable package of the invention that contains the susceptor ink composition printed on the surface of the substrate (bag) allows having a higher percentage of popcorns with appropriate organoleptic properties, that is a higher volume than the comparative microwaveable package.

4. Comparative Susceptor Ink Composition

A composition falling within the scope of the present invention (susceptor ink composition 2) was compared with comparative ink compositions disclosed in the state of art falling outside the scope of protection of the present invention (comparative ink compositions 1-4).

4.1. Susceptor Ink Composition 2

The composition of susceptor ink composition 2 of the present invention is shown in Tables 5-6, wherein the amount of the components are expressed in weight percent in relation to the total weight of the composition

TABLE 5

Ingredients of the susceptor ink composition 2

| Name | Function | Amount (%) |
|---|---|---|
| Aluminium based ink HIDROGRAF 12010072 | Metallic particles (and carrier) | 31.40 |
| carbon black based ink marketed as PAPERLIGHT 12.049.808 | Particles of semiconductor material (and carrier) | 62.79 |
| Silicon carbide (SiC) | Particles of semiconductor material | 1.57 |
| Sodium chloride (NaCl) | Alkaline or alkaline earth metal salt | 0.47 |
| H$_2$O | water | 3.77 |

TABLE 6

% of the components of the susceptor ink composition 2

| Name | Components | Amount (%) |
|---|---|---|
| Susceptor combination 1 | Aluminium[1] | 6.28 |
|  | Carbon black[2] | 5.02 |
|  | Silicon carbide | 1.57 |
|  | Sodium chloride | 0.47 |

[1]Aluminium is in form of aluminium based ink marketed as HIDROGRAF 12010072.
[2]Carbon black is in form of carbon black based ink marketed as PAPERLIGHT 12.049.808.

The susceptor ink composition 2 was prepared by adding the amount of Aluminum based ink (HIDROGRAF), the Carbon Black based ink (PAPERLIGHT), the Silicon Carbide and the Sodium Chloride indicated in Table 5 below under agitation.

4.2. Comparative Susceptor Ink Compositions 1-4

Comparative Ink Composition 1

Based on the example 3 of page 7 disclosed in EP0466361 the comparative ink composition 1 was prepared which contains aluminium and calcium carbonate as active ingredients. The comparative ink composition 1 contains the same amount of the active ingredients of the composition disclosed in EP0466361.

Table 7 shows the composition of the comparative ink composition 1, wherein the amount of the components are expressed in weight percent in relation to the total weight of the composition:

TABLE 7

Ingredients of the comparative ink composition 1

| | Name | Amount (%) |
|---|---|---|
| Aluminium based ink METABRITE[1] | Ethyl Acetate | 37.177 |
|  | Aluminum | 41.923 |
|  | Acrylic Resin | 15.8 |
|  | Calcium Carbonate | 5.1 |

[1]Metabrite contains 47% of ethyl acetate and 53% of aluminium. The comparative ink composition 1 contains 79.1% of Metabrite which corresponds to 37.177% of ethyl acetate and 41.923% of aluminum.

Comparative ink composition 1 was prepared by manually stirring the amount of METABRITE, Acrylic Resin and Calcium Carbonate indicated in Table 7 above.

Comparative Ink Composition 2

Based on the example 12 (table V, column 12) disclosed in U.S. Pat. No. 4,959,516, the comparative ink composition 2 was prepared which contains aluminum and silicon carbide as active ingredients. The comparative ink composition 2 contains the same amount of the active ingredients of the composition disclosed in U.S. Pat. No. 4,959,516.

Tables 8 and 9 show the composition of the comparative ink composition 2, wherein the amount of the components are expressed in weight percent in relation to the total weight of the composition:

TABLE 8

Comparative ink composition 2

| Name | Amount (%) |
|---|---|
| Aluminium | 31.53 |
| Silicon Carbide | 10.20 |
| Acrylic resin | 7.71 |
| Solvents | 50.55 |
| TOTAL | 100 |

TABLE 9

Ingredients of the comparative ink composition 2

| Name | | Amount (%) |
|---|---|---|
| Aluminium based ink METABRITE | Metabrite contains 47% ethyl acetate and 53% aluminum | 59.50 |
| EASYFLEX | Easyflex contains 44.6% acrylic resin and 55.4 ethyl acetate | 17.30 |
| | Ethyl acetate | 13 |
| | Silicon Carbide | 10.20 |

Comparative ink composition 2 was prepared by manually stirring the amount of METABRITE, EASYFLEX, ethyl acetate and silicon carbide indicated in Table 8 above.

Comparative Ink Composition 3

Based on the example 4 disclosed in U.S. Pat. No. 4,970,358, the comparative ink composition 3 was prepared which contains carbon black and magnesium sulfate heptahydrate as active ingredients. The comparative ink composition 3 contains the same amount of the active ingredients of the composition disclosed in U.S. Pat. No. 4,970,358.

Tables 10 and 11 show the composition of the comparative ink composition 3, wherein the amount of the components are expressed in weight percent in relation to the total weight of the composition:

TABLE 10

Comparative ink composition 3

| Name | Amount (%) |
|---|---|
| Magnesium Sulfate Heptahydrate (MgSO$_4$7H$_2$O) | 58.06 |
| H$_2$O | 35.42 |
| Carbon Black | 5.06 |
| Acrylic Resin | 1.46 |

TABLE 11

Ingredients of the Comparative ink composition 3

| Name | | Amount (%) |
|---|---|---|
| Magnesium Sulfate Heptahydrate | | 58.06 |
| Acrylic Resin | | 1.46 |
| CONDUCTEX ® SC Ultra Powder by Birla | 100% Carbon Black | 5.06 |
| H$_2$O | | 35.42 |

Comparative ink composition 3 was prepared by adding under agitation, the amount of CONDUCTEX, Acrylic Resin, Magnesium Sulfate Heptahydrate and water indicated in Table 11 above.

Comparative Ink Composition 4

Based on the example 2 column 15 disclosed in U.S. Pat. No. 4,959,516, the comparative ink composition 4 was prepared which contains the same ratio between the active ingredients of the composition disclosed in U.S. Pat. No. 4,959,516, particularly an aluminium and carbon black ratio of 8:1.

Table 12 shows the amount of each of the ingredients of the comparative ink composition 4. The percentage of aluminium and carbon black in comparative ink composition 4 are shown in Table 13.

TABLE 12

Ingredients of the comparative ink composition 4

| Name | Function | Amount (g) | Amount (%) |
|---|---|---|---|
| Aluminium based ink HIDROGRAF 12010072 | Metallic particles (and carrier) | 320 | 76.19 |
| Carbon black based ink marketed as PAPERLIGHT 12.049.808 | Particles of semiconductor material (and carrier) | 100 | 23.81 |

TABLE 13

% of the components of the comparative ink composition 4

| Name | Components | Amount (%) | Ratio |
|---|---|---|---|
| Comparative ink 4 | Aluminium | 15.23 | The Aluminium:Carbon black ratio is 8:1 |
| | Carbon black | 1.90 | |

Comparative ink composition 4 was prepared by adding 320 g of aluminium based ink (HIDROGRAF), and 100 g of the carbon black based ink (PAPERLIGHT) under agitation.

4.3. Printing Test

The Preparation of a Laminate Formed by Printing the Comparative Ink Compositions 1-2 on a Dielectric Substrate was Attempted.

Particularly, an attempt was made to print comparative ink composition 1 or comparative ink composition 2 on a 60 g/m$^2$ Kraft paper (commercially available from IMCOVEL), with a spiral applicator (Elcometer bar K0004360P001) of 250 mm in width and 10 μm in thickness. A small amount of the comparative ink composition 1 or comparative ink composition 2 was extended on the surface of the Kraft paper with the spiral applicator.

None of the comparative ink compositions 1-2 could be processed due to their rheological properties because they were too dense and too thick to be extended with a spiral applicator.

It was therefore concluded that comparative ink compositions 1-2 falling outside the scope of protection of the present invention are not suitable to be printed, and particularly through flexography or rotogravure.

4.4. Thermal Assays

Comparative ink compositions 3 and 4 and the susceptor ink composition 2 of the present invention were printed manually on a 60 g/m$^2$ Kraft paper and then thermal assays were performed.

Comparative Ink Composition 3

(i) Preparation of the Comparative Laminate 3

Comparative ink composition 3 was printed manually on a 60 g/m² Kraft paper (commercially available from IMCOVEL), with a spiral applicator (Elcometer bar K0004360P001) of 250 mm in width and 10 µm in thickness. A small amount of the comparative ink composition 3 was extended on the surface of the Kraft paper with the spiral applicator. Comparative ink composition 3 was printed in an area of 120×140 mm, with an approximate grammage of 10.78 g/m², to obtain the comparative laminate 3.

Then, the printed kaft paper thus obtained was protected by attaching greaseproof paper (commercially available as Gascogne with greaseproof Kit 10) to the side of the printed ink composition to obtain a laminate formed by the substrate (kraft paper) having the comparative ink composition 3 printed on the surface and covered by the protective dielectric layer. The substrate and the protective layer were bonded with Paniker industrial adhesive.

(ii) Preparation of the Comparative Package 3

The comparative laminate 3 obtained in step (i) was placed in a commercial popcorn bag, positioned where the commercial susceptor used to be (the commercial susceptor was previously trimmed and removed).

To the popcorn bag thus obtained, corn and fat/grease were introduced inside the bag. And, then the bag was sealed with Paniker industrial adhesive to obtain the microwaveable popcorn comparative bag 3.

(iii) Cooking Test

The microwaveable popcorn comparative bag 3 was cooked for 60 s in a conventional microwave at 700 W, when the cooking test had to be stopped due to the ignition of microwaveable popcorn comparative bag 3. An standard cooking test last 140 seconds, this is 2 minutes and 20 seconds, which microwaveable popcorn comparative bag 3 could not stand.

This results showed that the comparative ink composition 3 was not able to efficiently dissipate the heat generated. The popcorn bag therefore gets too hot, to the point of burning. It was therefore concluded that comparative ink composition 3 falling outside the scope of protection of the present invention is unsuitable for being used as susceptor (for heating foodstuffs).

Comparative Ink Composition 4

Comparative ink composition 4 and the susceptor ink composition 2 of the present invention were printed manually on a 60 g/m² Kraft paper and then thermal assays were performed.

Assay 1: Cooking Test (i) Preparation of Comparative Laminate 4 and Susceptor Laminate 2

Comparative ink composition 4 and the susceptor ink composition 2 of the present invention were printed manually on a 60 g/m² Kraft paper (commercially available from IMCOVEL), with a spiral applicator (Elcometer bar K0004360P001) of 250 mm in width and 10 µm in thickness. A small amount of each ink was extended on the surface of the Kraft paper with the spiral applicator. Comparative ink composition 4 and susceptor ink composition 2 of the present invention were printed in a rectangular area of 7.62×7.62 cm, with an approximate grammage of 10.78 g/m², to obtain the comparative laminate 3 and the susceptor laminate 2.

(ii) Cooking Test

Assay 1 consisted in evaluating the ability of the comparative laminate 4 and the susceptor laminate 2 to toast sliced bread in microwaves. For this purpose, a laminate-bread-laminate arrangement was made by placing the unprinted face of the printed kraft paper in contact with the sliced bread. It was heated in the microwave at maximum power for 45 seconds. 3 replicas and photographs of both sides of the bread for each replica were taken in order to assess the toasting/browning.

It was observed that, in the side having the susceptor ink composition 2 of the present invention, the ink was kept on the substrate. Meanwhile, in the side having the comparative ink composition 4, the ink is peeled off the paper, staining the bread.

This assay showed that comparative ink composition 4 did not endure the humidity that builds up when heating foodstuffs. Therefore, the comparative ink composition 4 falling outside the present invention is not suitable to be used as a (microwave) susceptor ink.

Assay 2: Thermic Camera Test (i) Preparation of Comparative Laminate 4 and Susceptor Laminate 2

Comparative ink composition 4 or susceptor ink composition 2 was printed manually on a 60 g/m² Kraft paper (commercially available from IMCOVEL), with a spiral applicator (Elcometer bar K0004360P001) of 250 mm in width and 10 µm in thickness. A small amount of the comparative ink composition 4 or the susceptor ink composition 2 was extended on the surface of the Kraft paper with the spiral applicator. Comparative ink composition 4 or susceptor ink composition 2 was printed in a rectangular area of 120×140 mm, with an approximate grammage of 10.78 g/m², to obtain a laminate of the comparative ink composition 4 or a susceptor laminate 2.

(ii) Thermic Camera Test

Heat capacity of the comparative ink composition 4 and the susceptor ink composition 2 was measured using a thermal imaging infrared camera and Research IR software (FLIR). Each laminate was heated using a modified microwave (Candy CMC 2395 DS) with a camera inserted in a cavity located in the upper part of the microwave. Each laminate was heated separately.

Each laminate was put on the plate of the microwave close to a beaker containing 300 mL of water to avoid the ignition of the sample. Both laminate and beaker were heated for 140 seconds at 700 W. Thermal images were taken at intervals of 20 seconds during the heating process. Temperature scale was set at 25-110° C. From each thermal image, both average and maximum temperatures on the susceptor surface were obtained.

Table 14 shows the values of maximum and average temperature reached with the laminate formed by the comparative ink composition 4 and the laminate formed by the susceptor ink composition 2 of the invention.

TABLE 14

| Laminate | | Time (s) | | | |
| --- | --- | --- | --- | --- | --- |
| | | 60 | 80 | 100 | 120 |
| Laminate formed by the comparative ink composition 4 | T average (° C.) | 43.6 | 45.7 | 45.8 | 47.4 |
| | T max (° C.) | 52.4 | 55.6 | 59 | 57.1 |
| Laminate formed by the susceptor ink composition 2 | T average (° C.) | 51.5 | 54.3 | 56.3 | 57.8 |
| | T max (° C.) | 107.9 | 85.7 | 103.3 | 112.9 |

As it is shown in Table 14 above, the values of maximum and average temperature reached with the laminate formed by the comparative ink composition 4 were markedly lower than those values reached with the laminate formed by the susceptor ink composition 2 (59° C. for comparative laminate 4 versus 113° C. for the laminate 2). These results show that the the susceptor ink composition have a greater (appropriate) heat capacity. Furthermore, a deficient attenuation of the heat generated in the susceptor can originate too high temperatures in some areas (above 175° C.) increasing the risk of ignition in the packaging. As the susceptor ink composition 2 of the present invention reached a maximum temperature of 112.9° C., it fulfills a balance between heating and attenuation that allows improving the heating of fodstuffs. It means that the susceptor ink composition of the present invention is suitable for being used as susceptor for heating foodstuffs.

However, the comparative ink composition 4 is unsuitable for being used as susceptor (for heating foodstuffs) because it fails to deliver high temperatures (above 100° C.) in some areas of the laminate, which are required to provide an appropriate performance in foodstuffs cooking.

CITATIONS

1. ASTM D1475-13, Standard Test Method For Density of Liquid Coatings, Inks, and Related Products, ASTM International, West Conshohocken, PA, 2013.
2. ASTM D1200-10(2014), Standard Test Method for Viscosity by Ford Viscosity Cup, ASTM International, West Conshohocken, PA, 2005.
3. EP0466361
4. U.S. Pat. No. 4,959,516
5. U.S. Pat. No. 4,970,358

The invention claimed is:

1. A susceptor ink composition comprising a susceptor combination and one or more carriers,
    wherein the susceptor combination comprises;
    metallic particles, wherein the metallic particles are selected from the group consisting of nickel, zinc, copper, aluminum, and mixtures thereof;
    particles of at least two semiconductor materials, wherein the semiconductor materials are selected from the group consisting of carbon black, titanium carbide, silicon carbide, zinc oxide, and mixtures thereof; and
    one or more alkaline metal salts, wherein the one or more alkaline metal salts comprise a cation and an anion; wherein the cation is selected from the group consisting of $Na^+$ and $K^+$; and wherein the anion is selected from the group consisting of $Cl^-$ and $F^-$;
    wherein the amount of the susceptor composition comprises from 6.7% to 40% by weight of the total weight of the susceptor ink composition.

2. The susceptor ink composition according to claim 1, wherein the one or more carriers is selected from the group consisting of one or more solvents, resins, antifoamers, plasticizers and mixture thereof.

3. A laminate comprising:
    a dielectric substrate, and
    a susceptor ink composition as defined in claim 1 printed on the substrate; and
    optionally a dielectric protective layer onto the substrate.

4. A microwaveable package comprising the laminate as defined in claim 3.

5. The susceptor ink composition according to claim 1, wherein the one or more alkaline metal salts comprises sodium chloride.

6. A susceptor ink composition comprising a susceptor combination and one or more carriers, wherein the susceptor combination comprises;
    metallic particles,
    particles of at least two semiconductor materials, and
    one or more alkaline metal salts;
    wherein the susceptor combination comprises: aluminum, carbon black, silicon carbide, and sodium chloride.

7. The susceptor ink composition according to claim 6, wherein the weight ratio between the aluminum and carbon black is from 2:1 to 1:4.

8. The susceptor ink composition according to claim 6, comprising:
    from 2% to 15% by weight of aluminum of the total weight of the susceptor ink composition;
    from 2% to 15% by weight of carbon black of the total weight of the susceptor ink composition;
    from 0.2% to 25% by weight of silicon carbide of the total weight of the susceptor ink composition; and
    from 0.2% to 5% by weight of sodium chloride of the total weight of the susceptor ink composition.

9. The susceptor ink composition according to claim 8, wherein the amount of the susceptor combination comprises from 10% to 25% by weight of the total weight of the susceptor ink composition.

10. A laminate comprising a dielectric substrate and a susceptor ink composition as defined in claim 8 printed on the substrate; and optionally a dielectric protective layer onto the substrate.

11. The susceptor ink composition according to claim 6, wherein the amount of the susceptor composition comprises from 10% to 25% by weight of the total weight of the susceptor ink composition.

* * * * *